United States Patent Office 3,373,217
Patented Mar. 12, 1968

3,373,217
HYDROGENOLYSIS OF SYM-DIPHENYLETHANE TO ETHYLBENZENE
Robert M. Engelbrecht and Richard N. Moore, St. Louis, and James C. Hill, Chesterfield, Mo., assignors to Monsanto Company, St. Louis, Mo., a corporation of Delaware
No Drawing. Filed Mar. 22, 1967, Ser. No. 624,988
10 Claims. (Cl. 260—668)

ABSTRACT OF THE DISCLOSURE

A process for the production of ethylbenzene by thermally hydrocracking bibenzyl (1,2-diphenylbenzene).

Background of the invention

The present invention relates to a method for the production of ethylbenzene. More particularly, the present invention relates to a method for the production of ethylbenzene from bibenzyl.

Presently there is an ever-increasing demand for styrene and practically all styrene produced at the present time is by the dehydrogenation of ethylbenzene. Most of the ethylbenzene used in styrene production is produced by the alkylation of benzene with ethylene and in recent years a growing source of ethylbenzene has been from the fractionation of a petroleum stream. However, as the demand for styrene, and in turn ethylbenzene, becomes greater and greater each year, new methods for producing ethylbenzene are being sought. It is to this problem that the present invention is directed.

Summary

It is an object of the present invention to provide a method for the production of ethylbenzene. The further object of the present invention is to provide a process for the production of ethylbenzene from bibenzyl. Additional objects will become apparent from the following description of the present invention.

The present invention in one of its embodiments is a process for the production of ethylbenzene comprising hydrocracking bibenzyl in the presence of from one to forty moles of hydrogen per mole of bibenzyl in a thermal hydrocracking zone maintained at temperatures of from about 350° C. to 700° C. and pressures of from about 100 p.s.i.g. to 5000 p.s.i.g. or as high as engineering principles and construction costs permit, withdrawing the effluent from said hydrocracking zone, and separating ethylbenzene from said effluent.

Description of the preferred embodiments

In order to demonstrate the present invention as well as to describe its operation, the following example is presented.

Example

Several runs were made for the hydrocracking of bibenzyl. In each run a solution comprised of bibenzyl and toluene in the ratio of 2 moles toluene per mole of bibenzyl was pumped to a thermal reactor along with 21 moles of hydrogen per mole of bibenzyl. The thermal reactor was maintained at about 700 p.s.i.g. in each of the runs and the feed to the reactor was regulated so as to maintain an effective residence time of the reactants in the reactor of about 12 seconds. The following table shows the temperature in each run and the conversions and yields obtained at the various temperatures. Conversion is defined as that percentage of the bibenzyl charged to the reactor and converted to any other product.

The yield is expressed as the percentage of theoretical, which is one mole of ethylbenzene per mole of bibenzyl converted.

TABLE

| Run No. | Reaction T, °C. | Conversion of Bibenzyl, Percent | Yield of Ethylbenzene, Percent |
|---|---|---|---|
| 1 | 502 | 19.5 | 34.6 |
| 2 | 557 | 74.7 | 25.6 |
| 3 | 576 | 88.9 | 22.8 |
| 4 | 599 | 97.6 | 18.6 |
| 5 | 626 | 98.7 | 12.7 |
| 6 | 653 | 99.3 | 8.1 |

The thermal hydrocracking of the present invention may be carried over various conditions of temperature and pressure. Generally, the temperature will be within the range of about 400 to 700° C. with temperatures of from about 450 to 650° C. being preferred. The pressure ordinarily should be within the range of from about 100 to 5000 p.s.i.g. but preferably within the range of from about 200 to 2000 p.s.i.g. The hydrogen in the hydrocracking zone should be present in amounts of from one to forty moles per mole of bibenzyl charged to the hydrocracking zone although amounts of from about 3 to 25 moles $H_2$ per mole bibenzyl are preferred. This hydrogen may be mixed with the bibenzyl before charging the bibenzyl to the hydrocracking zone or may be added separately to the hydrocracking zone.

In carrying out the practice of the present invention, the residence time of the reactants in the reaction zone will generally vary from about one to thirty seconds. However, it is preferred that the residence time be within the range of about three to twenty seconds.

Bibenzyl is a solid at ordinary room temeperature and in order to facilitate the handling and transporting of the bibenzyl it is convenient, although not necessary, that the bibenzyl charged to the hydrocracking zone be at least partially dissolved in a hydrocarbon solvent. The hydrocarbon solvent may be either aromatic or nonaromatic although the aromatic solvents are the most desirable. Especially preferred are the mononuclear aromatic solvents such as benzene, toluene, xylene, and the like. Of course it is understood that the hydrocarbon solvent may be comprised of mixtures of different compounds. The amount of hydrocarbon solvent used need only be enough to partially dissolve the bibenzyl although it is preferred that the bibenzyl be completely dissolved. When using a solvent, the amount of solvent needed will vary according to the particular solvent being used but the amount of solvent will generally be from about 0.5 to 5.0 moles per mole of bibenzyl. It is preferred to use from about one to three moles of hydrocarbon solvent per mole of bibenzyl.

The equipment which may be used in carrying out the present invention is not critical and any conventional thermal hydrocracking equipment may be used. It is only necessary that the equipment be such as to withstand the pressures and temperatures of the reactions and that the equipment follow good engineering principles. Also the equipment and methods for separating the ethylbenzene from the effluent of the hydrocracking zone does not constitute a part of the present invention. The ethylbenzene, as well as benzene and unreacted bibenzyl, will normally be separated from the effluent of the hydrocracking zone by ordinary fractional distillation. Any unreacted bibenzyl can be recycled to the hydrocracking zone.

What is claimed is:
1. A process for the production of ethylbenzene comprising hydrocracking bibenzyl in the presence of from one to forty moles of hydrogen per mole of bibenzyl in a thermal hydrocracking zone maintained at temperatures of from about 350 to 700° C. and pressures of from 100 to 5000 p.s.i.g., withdrawing the effluent from said hydrocracking zone, and separating ethylbenzene from said effluent.

2. The process of claim 1 wherein residence time of the reactants in said hydrocracking zone is from about one to thirty seconds.

3. The process of claim 2 wherein said hydrocracking zone is maintained at temperatures of from about 450 to 650° C.

4. The process of claim 1 wherein there are from about three to twenty-five moles hydrogen per mole of bibenzyl.

5. The process of claim 1 wherein the bibenzyl charged to said hydrocracking zone is at least partially dissolved in a hydrocarbon solvent.

6. The process of claim 5 wherein said hydrocarbon solvent comprises toluene.

7. The process of claim 5 wherein said hydrocracking zone is maintained at temperatures of from about 450 to 650° C. and wherein the residence time in said hydrocracking zone is from about three to twenty seconds.

8. The process of claim 7 wherein said hydrocarbon solvent is a mononuclear aromatic hydrocarbon solvent.

9. The process of claim 8 wherein there is from about three to twenty-five moles of hydrogen per mole of bibenzyl.

10. The process of claim 9 wherein said aromatic hydrocarbon solvent is toluene present in amounts of from about 0.5 to 5.0 moles of toluene per mole of bibenzyl.

References Cited

UNITED STATES PATENTS

| | | | |
|---|---|---|---|
| 2,282,327 | 5/1942 | Dreisbach | 260—668 |
| 2,338,973 | 1/1944 | Schmerling | 260—667 |
| 3,222,411 | 12/1965 | Beuther et al. | 260—672 |

DELBERT E. GANTZ, *Primary Examiner.*

G. E. SCHMITKONS, *Assistant Examiner.*